United States Patent [19]

Voll et al.

[11] 4,175,802

[45] Nov. 27, 1979

[54] BORING SPINDLE WITH AUTOMATIC TOOL LIFTOFF

[75] Inventors: Horst Voll, Hassfurt; Franz Kessler, Ebern; Max Herla, Schwebheim, all of Fed. Rep. of Germany

[73] Assignee: Kugelfischer Georg Schafer & Co., Schweinfurt, Fed. Rep. of Germany

[21] Appl. No.: 883,049

[22] Filed: Mar. 3, 1978

[30] Foreign Application Priority Data

Mar. 4, 1977 [DE] Fed. Rep. of Germany ....... 2709448

[51] Int. Cl.² .......................................... B23B 29/034
[52] U.S. Cl. ......................................... 308/9; 308/35; 308/187; 308/207 A; 308/DIG. 13
[58] Field of Search ..................... 308/35, 9, 161, 187, 308/122, DIG. 13, DIG. 15, 189 A, 162, 207 A, 184 A

[56] References Cited

U.S. PATENT DOCUMENTS

| 3,664,718 | 5/1972 | Uhtenwoldt ..................... 308/189 A |
| 3,686,986 | 8/1972 | Ledergerber et al. ...... 308/189 A X |
| 3,721,161 | 3/1973 | Bobst ............................... 308/35 X |

FOREIGN PATENT DOCUMENTS

2409721 9/1975 Fed. Rep. of Germany .
1085264 1/1955 France ............................ 308/DIG. 13

OTHER PUBLICATIONS

*Werkstatt und Betrieb* entitled *Lagerungen für Werkzeugmaschinenspindeln,* vol. III (1978), No. 4, p. 234.
Publication No. 44110 EA, The Sliding Pad Bearing in FAG Hydrodynamic Spindles, FAG Kugelfischer Georg Schäfer & Co., Plant Ebern.

*Primary Examiner*—Douglas C. Butler
*Attorney, Agent, or Firm*—Karl F. Ross

[57] ABSTRACT

A boring spindle unit with automatic tool liftoff, especially for the finish boring of a workpiece with an oxide-ceramic boring tool carried by the spindle shaft. The spindle shaft is journaled in at least two main bearings and at least a further bearing is disposed proximal to the main bearing at the tool end of the shaft. During the spindle retraction movement, the additional bearing takes up the journaling of the shaft and has an axis which is offset by a distance from the axis of the main bearings and in a direction opposite that from which the tool projects from the shaft so that the tool does not groove the workpiece during the retraction operation. While the main bearings are effected, the auxiliary bearing receives the shaft with radial play and, while the auxiliary bearing is effective, at least the main bearing proximal to the tool end receives the shaft with radial play.

8 Claims, 2 Drawing Figures

BORING SPINDLE WITH AUTOMATIC TOOL LIFTOFF

FIELD OF THE INVENTION

The present invention relates to a spindle assembly for the boring of a workpiece and, more particularly, to a spindle unit having automatic tool liftoff as is especially desirable for the finish boring of the workpiece using an oxide-ceramic boring tool.

BACKGROUND OF THE INVENTION

In the boring of a workpiece, the latter is generally provided with a roughed-out hole or bore which must be turned internally to the desired diameter with the desired tolerance by a boring tool carried at an end of a shaft which extends into the hole of the workpiece and is rotated as part of a spindle unit while the workpiece is maintained stationary. The tool, which may be an oxide-ceramic in the case of finish boring of holes to high-precision tolerances, projects laterally from the ends of the spindle shaft which is journaled in a housing capable of being advanced to shift the tool further into the workpiece.

While fine boring is generally carried out with a relatively limited cutting force, the tool, the workpiece, the spindle unit and the chuck arrangement elastically deform during the process. Upon retraction of the tool from the finished bore, the cutting force is relieved and the elastically deformed parts relax which can cause the tool to spring against the finished surface of the bore and cut grooves in the latter. Even when these grooves are of slight depth, they detrimentally affect the surface finish, the useful life of the workpiece when the latter is employed as a bearing, and even the service life of the part formed with the bore and the tool. For this reason, tool-liftoff devices have been proposed to prevent the tip of the tool from engaging the finished surface during withdrawal of the boring tool.

In the brochure "Das Gleitstützenlager in hydrodynamischen FAG-Spindeln," publication No. 44 110 Kugelfischer Georg Schafer & Co., Werk Ebern, Germany, at page 11, there is described and illustrated a fine-boring spindle provided with an effective tool-liftoff device. When the working end of the spindle unit reaches its final position and machining is to be concluded, the spindle unit is braked. An annular piston built into the shaft end is hydraulically displaced somewhat to impart play to the bearings. A further annular piston behind the bearing at the working end of the arrangement is then displaced so that its conical bore bears against a pin projecting from the shaft in the plane of the tool to displace the latter away from the surface of the workpiece and thereby shift the center or axis of the shaft for retraction relative to the working axis of the shaft.

While this arrangement has been found to be highly suitable for many purposes, it has been found to be disadvantageous in the respect that the spindle unit must be brought to standstill before liftoff is effected. The stopping of the spindle arrangement with on and off switching devices is, naturally, time consuming and may be detrimental when the shaft is journaled in hydrodynamic sleeve bearings. In this case, each time the machine is started or stopped, a transition between the mixed friction and solid-body friction characteristics must occur. As is well known with hydrodynamic bearings of this type, such transitions are detrimental to the life of the unit provided with the bearing.

In German printed application (Auslegeschrift) DT-AS 24 09 721, there is described a liftoff device in which the liftoff of the tool edge from the finished surface of the workpiece is effected by radial shifting of the shaft. In this case, use is made of a circumferential liquid-pressure cushion. A disadvantage of this arrangement is the requirement that the force transmission (hydraulic medium or toggle lever) the effective through the rotating shaft which causes problems such as sealing, friction losses and the like. The problem is especially pronounced and the system less convenient when it is necessary to provide a hollow shaft to facilitate transfer of the tool.

OBJECT OF THE INVENTION

It is the object of the present invention to provide a spindle unit with an automatic tool liftoff, for a boring tool of the type described which is free from the disadvantages of the earlier systems mentioned previously and especially permit the liftoff of the tool while the shaft is rotating.

SUMMARY OF THE INVENTION

This object and others which will become apparent hereinafter are attained, in accordance with the present invention, in a spindle unit for the fine boring (low-tolerance or high-precision boring) of a workpiece with an oxide-ceramic rotating boring tool, in which a tool liftoff device is provided. According to the invention, the spindle unit comprises a housing in which a shaft carrying the boring tool at one end is rotatably journaled in at least two spaced apart main bearings. Between the main bearing and proximal to the main bearing at the tool end of the shaft, there is provided a further or auxiliary bearing which is effective during the retraction of the spindle unit to take up the journaling of the shaft. The inner bearing surface (i.e. the inner race or a bearing surface formed directly on the shaft) is offset by an amount "e" from the axis of the main bearings in the direction opposite that in which the tool projects. During the working phase, the further or auxiliary bearing is received within the housing with radial play while the adjacent main bearing is effective to journal the shaft without play while in the liftoff phase, this main bearing is seated with radial play in the housing while the auxiliary bearing carries the shaft without play.

According to a feature of the invention, the radial plays are established by a corresponding axial displacement of frustoconical bearing support rings. The axial displacement can be effected by hydraulic pistons or a hydraulic piston. Springs can be provided to act axially against the bearing support rings counter to the direction in which the hydraulic piston is effective.

Preferably, all of the bearings are formed as sleeve bearings and, most advantageously, as hydrodynamic sleeve bearings in one embodiment of the invention. In another embodiment of the invention at least some of the bearings can be conical or combined thrust and radial bearings.

According to an important feature of the invention, the auxiliary bearing can be constituted as a hydrostatic bearing with considerable radial play during the forward movement of the spindle, i.e. during the actual boring of the workpiece.

With the system of the present invention it is possible automatically to lift the tool from the finished surface of the workpiece upon retraction of the spindle unit without having to bring the spindle unit to standstill. In this way it is possible to save considerable time in the machining operation, to increase the service life of the tool and of the spindle unit. Furthermore, the shaft need not be traversed by hydraulic medium lines for force transfer and can be constituted as a hollow shaft as is frequently desirable for the reasons stated above.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
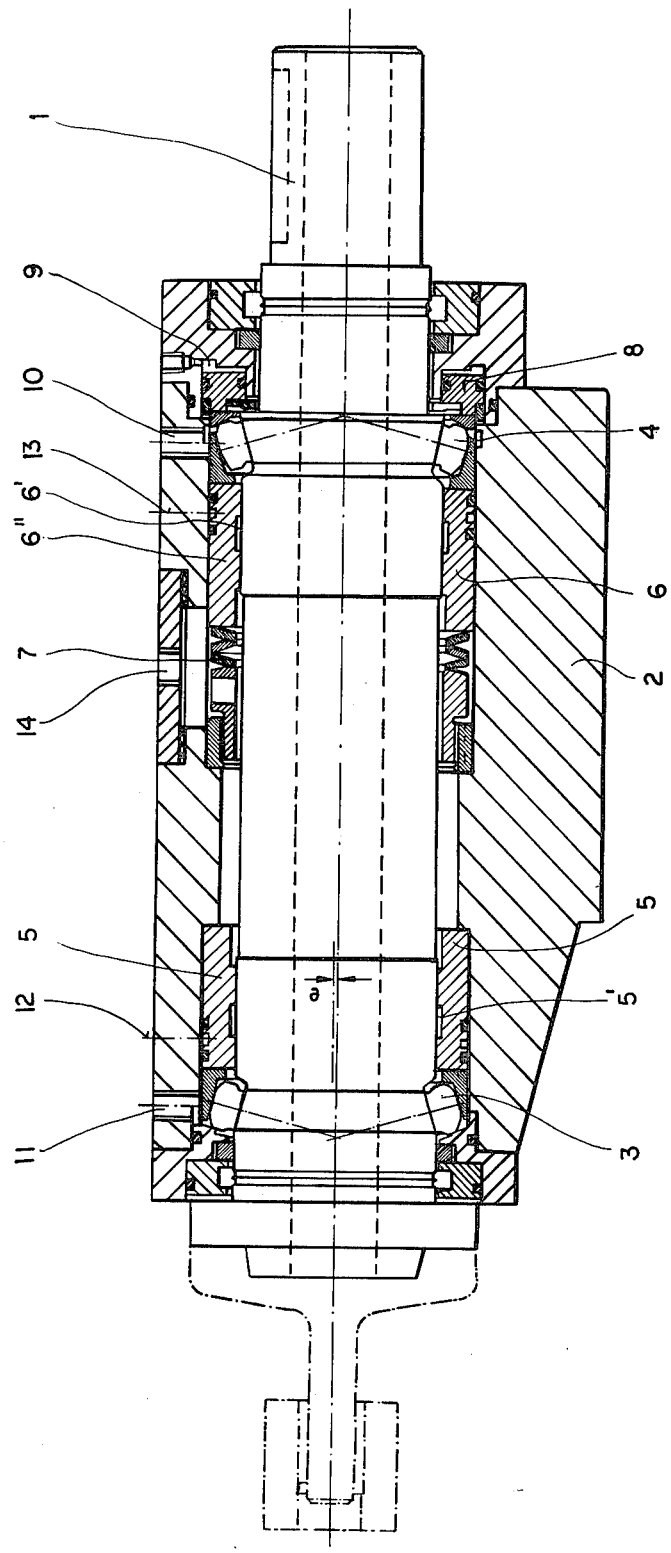
FIG. 1 is an axial cross-sectional view through a fine-bore spindle unit provided with a tool liftoff device according to the invention, hydrostatic bearings being provided for journaling the shaft during retraction while in normal operation the shaft is journaled in prestressed hydrodynamic bearing.

In FIG. 1 there is shown a spindle unit which comprises a shaft 1 and a housing 2. The shaft 1 is journaled in a hydrodynamic main bearing 3 disposed on the working end of the shaft 1 and a drive-side hydrodynamic main bearing 4 and the opposite end of this shaft.

At the working side of the shaft, which is provided with a laterally projecting tool adapted to bore a hole in a workpiece, as shown in dot-dash lines, the tool being mounted upon this end of shaft 1, there is provided a further bearing 5 (auxiliary bearing) which is effective during retraction of the spindle unit to take up the journaling of the shaft 1.

In the embodiment of FIG. 1, this bearing 5 is constituted as a hydrostatic bearing and comprises the bearing pockets 5' and a bearing shell 5". A further hydrostatic bearing 6 is disposed ahead of the hydrodynamic main bearing 4.

At least the hydrostatic bearing 5 at the working end of the shaft 1 is formed with its shaft or inner running surface (inner race or the corresponding surface of the shaft directly) with an axis which is offset by an amount e (FIGS. 1 and 2) from the working axis of the main bearings toward the edge of the cutting tool. It thus has a large radial play.

The hydrodynamic main bearing 4 is prestressed by a Belleville-spring stack 7 during the boring operation. Since this prestress is detrimental during startup of the spindle, i.e. from standstill until the spindle has reached its cutting speed, the hydrodynamic main bearing 4 is provided with a piston 8 which is effective against the force of the spring stack 7 when its hydraulic chamber 9 is pressurized. This piston 8 relieves the spring pressure on the hydrodynamic bearing 4. Oil for hydraulic medium feed lines 10 and 11 can be provided in the housing 2 to supply lubricating oil to the hydrodynamic bearings 3 and 4. The hydrostatic bearings 5 and 6 are supplied with hydraulic fluid (oil) under pressure through hydraulic medium bores 12 and 13, respectively. An oil-return passage 14 returns the oil to the oil-circulating path.

For the spindle unit of FIG. 1, there are three operating conditions differing by the control of the oil supply.

During startup of the spindle, i.e. the range of speeds from standstill of the shaft to attainment of the machining speed, the hydrodynamic main bearings 3 and 4 are relieved from axial pressure so as to permit a rapid passage through the mixed friction range. This relief of the spring pressure, naturally, also minimizes the loading of the bearing during startup. In this case, the oil is fed via the lubricant-feed passages 10 and 11 to the hydrodynamic bearing. The pressure chamber 9 is supplied with oil under pressure so that the piston 8, which cooperates with the outer ring of the hydrodynamic main bearing 4, presses the latter against the Belleville-stack 7 and thus relieves the entire bearing arrangement. During this period, the hydrostatic bearings 5 and 6 are not supplied with oil under pressure.

During the boring operation, the hydrodynamic main bearings 3 and 4 are no longer relieved and the supply of oil under pressure to the piston chamber 9 is interrupted. The spring stack 7 stresses the main bearings 3 and 4 against one another. The main bearings 3 and 4 are supplied with the lubricant via passages 10 and 11 and the hydrostatic bearings 5 and 6 remain without oil under pressure.

Upon retraction of the spindle unit, i.e. for liftoff of the tool, the pressure chamber 9 is again supplied with oil under pressure to relieve the axial forces on the hydrodynamic main bearings 3 and 4. In addition, the hydrostatic bearings 5 and 6 are supplied with oil under pressure via passages 12 and 13. This shifts the running face of the hydrodynamic bearing 5 relative to the axis of the main bearing 3 by the distance e so that the entire shaft 1 now rotates about the axis of the hydrostatic bearing 5, the hydrodynamic bearings 3 and 4 being relieved. The radius between the center point of the axis of rotation and the cutting edge of the tool is thus reduced by the distance e so that the tool can be withdrawn from the bore without the danger of contact with the finished surface. It is not necessary to bring the shaft 1 to standstill. Upon the next machining operation, it is simply necessary to interrupt the flow of the pressurized oil to the hydrostatic bearing 5 and to interrupt the supply of fluid under pressure to chamber 9. The spring stack 7 becomes effective again and the shaft 1 rotates about the axis defined by the bearings 3 and 4 so that machining can begin again.

Figure 2:
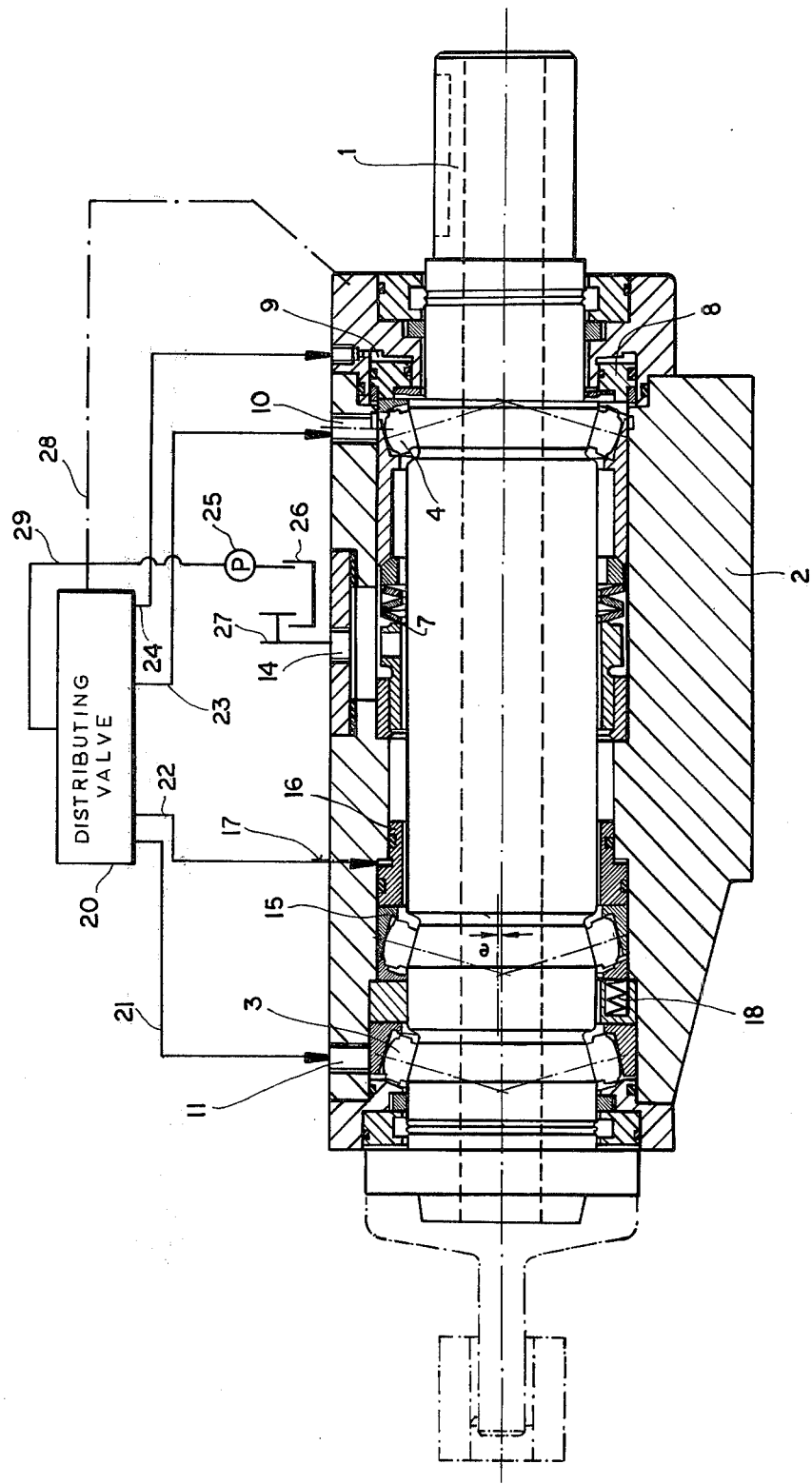
FIG. 2, directed to a different embodiment is a similar view of a spindle unit in which the shaft is journaled during retraction in hydrodynamic bearings.

In the embodiment of FIG. 2, the shaft 1 is shown to be journaled only in hydrodynamic bearings. In this case, two hydrodynamic main bearings 3 and 4 are provided to journal the shaft 1 during startup and boring of the workpiece.

As has already been described in connection with FIG. 1, the hydrodynamic main bearings 3 and 4 are relieved by the piston 8 during the startup. The piston 8 acts against the Belleville-spring stack 7 when the hydraulic chamber 9 is supplied with oil under pressure.

In addition to the hydrodynamic main bearing 3, the shaft 1 is surrounded by a further hydrodynamic bearing 15 (auxiliary bearing) whose center is offset by the distance e in the direction of the tool edge from the axis of the hydrodynamic main bearing 3. This hydrodynamic bearing 15 can be axially shifted by a piston 16 which is displaced when oil under pressure is fed to the chamber 17. During the startup of the shaft 1, the chamber 9 is supplied with oil under pressure so that the hydrodynamic bearings 3 and 4 are relieved from the force of the spring stack 7. The shaft is thus rapidly driven at a high speed without loading.

When the shaft has reached its cutting speed, the supply of pressure to the chamber 9 is interrupted so that the spring stack 7 is effective to stress the hydrodynamic main bearings 3 and 4 against one another and journal the shaft 1 firmly for rotation about its normal axis as defined by these main bearings.

A hydrodynamic bearing 15 is shifted by the springs 18 into a relief position and does not rotatably support the shaft 1, being received with substantial play within the housing.

After the working phase terminates, the chamber 9 is supplied with oil under pressure to relieve the hydrodynamic main bearing 3. The hydraulic chamber 17 is also now pressurized so that piston 16 displaces the hydrodynamic bearing 15 against the spring 18 and causes this bearing to engage the frustoconical running surface of the shaft and render bearing 15 effective as the journal bearing for this shaft.

Since the center of the hydrodynamic bearing 15 is offset from the working axis by the distance e, the hydrodynamic main bearing 3 being relieved, the cutting edge is lifted from the machine surface and can be withdrawn without forming grooves therein.

It is especially advantageous that the hydraulic medium feed need not be effected through rotating parts so that the shaft can be constituted as a hollow shaft which is especially important in modern machine tools with automatic tool-changing devices and chucks.

A distributing valve 20 may be used to control the flow of the oil to the various ports. Thus the valve 20 can have a line 21 connected to the passage 11, a line 22 connected to the chamber 17, a line 23 connected to the passage 10 and a line 24 connected to the chamber 9. The return flow of the lubricant can be effected from passage 14 via line 27 to a reservoir 26 from which a pump 25 displaces the oil to the valve via line 29.

The distributing valve 20 may be coupled, as represented by the dot-dash line 28, to the spindle so that at each reverse movement of the spindle unit, the tool is automatically lifted form engagement with the surface of the workpiece.

We claim:
1. A spindle unit for the fine boring of a workpiece, comprising:
   a spindle housing;
   a shaft received in said housing and formed with a tool end and a drive end;
   at least two axially spaced main bearings received in said housing and journaling said shaft therein, one of said main bearings being disposed proximal to said tool end and the other of said main bearings being disposed proximal to said drive end;
   at least one further bearing received in said housing proximal to said tool end and constructed and arranged to take up the journaling of said shaft, said further bearing having an inner running surface having a center offset from the axis of rotation of said main bearings whereby, during the boring of said workpiece, the main bearings are effective to journal the shaft and said further bearing is received with radial play in the housing while during return movement of the shaft, the said one of said main bearings being received with radial play in the housing while said further bearing is effective to journal the shaft about its axis;
   a respective frustoconical support ring for at least one of the bearings proximal to said tool end, the radial play of said one of the bearings proximal to said tool end being produced by axial displacement of said frustoconical bearing support ring;
   a hydraulic piston operatively connected to said bearing support ring for axially displacing same; and
   a spring bearing upon said bearing support ring in a direction opposite the direction in which said piston is effective.

2. The spindle unit defined in claim 1 wherein the radial play of at least one of the bearings proximal to said tool end is produced by axial displacement of a respective frustoconical bearing support ring.

3. The spindle unit defined in claim 2, further comprising a hydraulic piston operatively connected to said bearing support ring for axially displacing same.

4. The spindle unit defined in claim 3 further, comprising a spring bearing upon said bearing support ring in a direction opposite the direction in which said piston is effective.

5. The spindle unit defined in claim 1 wherein both of said bearings proximal to said tool end are provided with frustoconical bearing support rings axially displaceable by hydraulic pistons against respective springs.

6. The spindle unit defined in claim 1 wherein each of said bearings is a sleeve bearings.

7. The spindle unit defined in claim 6 wherein each of said bearings is a hydrodynamic sleeve bearings.

8. The spindle unit defined in claim 1 wherein said further bearing is a hydrostatic bearing.

* * * * *